(No Model.)
S. C. & F. G. LONG.
BAKING PAN.
No. 486,259. Patented Nov. 15, 1892.
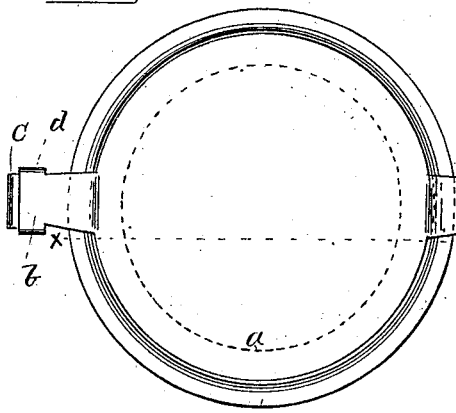
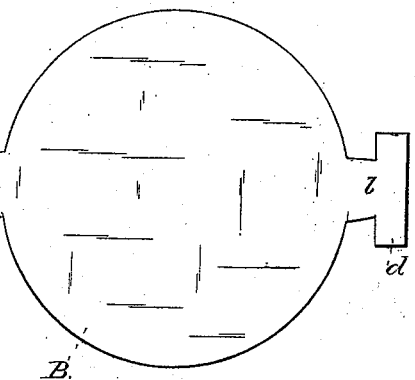
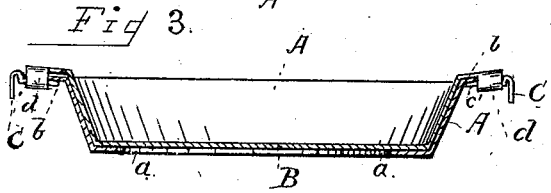
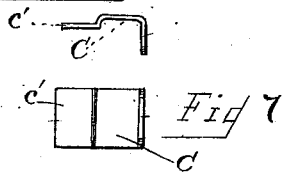
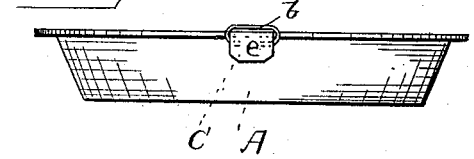
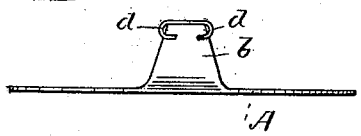
WITNESSES:
R. Jay McCarty
Harry Conover Jr
INVENTORS
Sumner C. Long
Frances G. Long
BY Toulmin & Toulmin
Their ATTORNEYS
THE NORRIS PETERS CO., PHOTO-LITHO., WASHINGTON, D. C.

UNITED STATES PATENT OFFICE.

SUMNER C. LONG AND FRANCES G. LONG, OF DAYTON, OHIO.

BAKING-PAN.

SPECIFICATION forming part of Letters Patent No. 486,259, dated November 15, 1892.

Application filed July 19, 1892. Serial No. 440,562. (No model.)

*To all whom it may concern:*

Be it known that we, SUMNER C. LONG and FRANCES G. LONG, citizens of the United States, residing at Dayton, in the county of Montgomery and State of Ohio, have invented certain new and useful Improvements in Baking-Pans, of which the following is a specification, reference being had therein to the accompanying drawings.

Our invention relates to improvements in articles adapted to culinary purposes, and is confined more particularly to a useful improvement in pastry-baking pans.

Our invention was brought forth with special knowledge of the wants of a baking-pan especially adapted to pie-baking; but it has been found quite as suitable and desirable for cakes also.

The object of our invention is to provide a baking-pan with handles by which the same may be conveniently and easily handled, the handles also furnishing a means for holding in contact with the other portion of the pan a detachable bottom; also, to provide a baking-pan with a false or detachable bottom that may be easily released from the pan, thus freeing the pie from the sides of the pan and presenting the edible in a position to be cut and served, doing away with the accustomed and well-known process of gouging, digging, and sectional removal of the aforesaid viand.

In the accompanying drawings, forming part of this specification, Figure 1 is a plan view of our pie-plate intact, showing in broken lines the edge of the inwardly-extending bottom of the plate; Fig. 2, a detached plan view of the detachable or false bottom; Fig. 3, a transverse section of the pan intact on the line $x\ x$ of Fig. 1; Fig. 4, a side elevation with the handles in a contrary position to that shown in Fig. 3; Fig. 5, a detached side edge view of the sliding clamp; Fig. 6, an end view of the false bottom removed, showing the sliding clamp removed from the handle; Fig. 7, a plan view of the sliding clamp.

Coming now to a more detailed description, the letter A denotes the baking-pan, which in this instance comprises the inclined sides and rim with a partial bottom $a$, as indicated by the broken lines, Fig. 1.

The letter B represents the false bottom, having outward extensions $b$, which are susceptible of being bent in a manner that constitutes them the handles by which the device is manipulated.

The letter C shows a sliding clamp adapted to fit and slide on the extension or handle $b$. This sliding clamp is maintained in its sliding position by extensions $d$ of the handles being bent over to form a sliding-place and support therefor. The inward and outward movement of the sliding clamp C is effected by the outer end thereof being bent downward, by which the finger has means of operating the same in the said direction.

$c'$ denotes the inner end of the sliding clamp. The exact shape is shown in Fig. 5. By pressing this clamp inwardly, as is shown in Fig. 3, it engages with the under portion of the plate-rim, and thereby maintains the false bottom in contact with the plate.

When the pie is sufficiently baked, the pan is conveniently removed from the stove or range by the handles, the sliding clamps C withdrawn from engagement with the rim of the plate, and the bottom lifted out, bearing the pie thereon in a most agreeable position to be properly cut or slipped off.

Having described our invention, what we claim as new, and desire to secure by Letters Patent, is—

1. In a pastry-baking pan, a pan with the usual sides and rim minus a bottom, in combination with a false bottom with wings or extensions thereon adapted to be bent over to form handles and to admit of the said bottom being placed in the pan, sliding clamps to fit and move on the said handles, the inner end of said clamps adapted to fit under the rim of said pan when pushed inwardly to hold the false bottom in contact with the pan, substantially as herein described.

2. In a pie-plate or baking-pan, the herein-described pan, in combination with the false or detachable bottom and handles being an entirety, means of attaching and detaching the said bottom with and from the pan, substantially as herein described.

3. In a pie or pastry baking pan, the plate or pan A, the false bottom therefor having wings or extensions $b$, forming the handles thereof, and supports $d$ for the sliding clamp C, as herein described, and for the purposes set forth.

In testimony whereof we affix our signatures in presence of two witnesses.

SUMNER C. LONG.
FRANCES G. LONG.

Witnesses:
R. JAY McCARTY,
HARVEY CONOVER, Jr.